A. VAN BRUNT.
WATER COLUMN.
APPLICATION FILED JULY 2, 1912.

1,097,274.

Patented May 19, 1914.

WITNESSES:
Fred J. Thomas.
Elizabeth Van Brunt.

INVENTOR
Abram Van Brunt.

A. VAN BRUNT.
WATER COLUMN.
APPLICATION FILED JULY 2, 1912.
1,097,274.
Patented May 19, 1914.
2 SHEETS—SHEET 2.
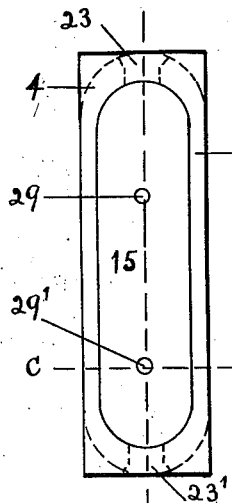
Fig. 5.
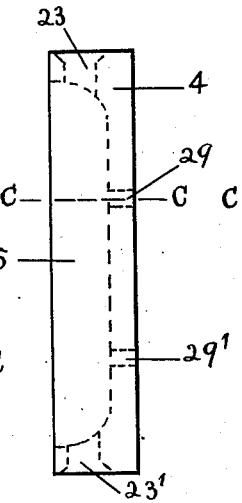
Fig. 6.
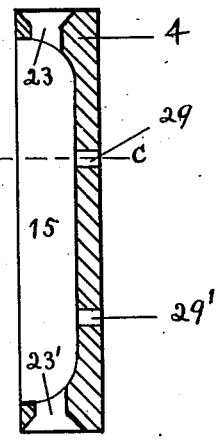
Fig. 7.
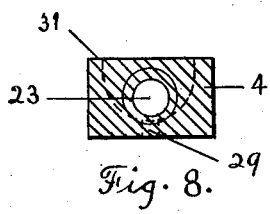
Fig. 8.
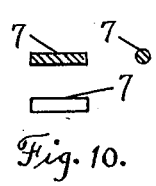
Fig. 10.
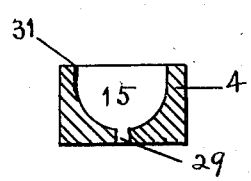
Fig. 9.
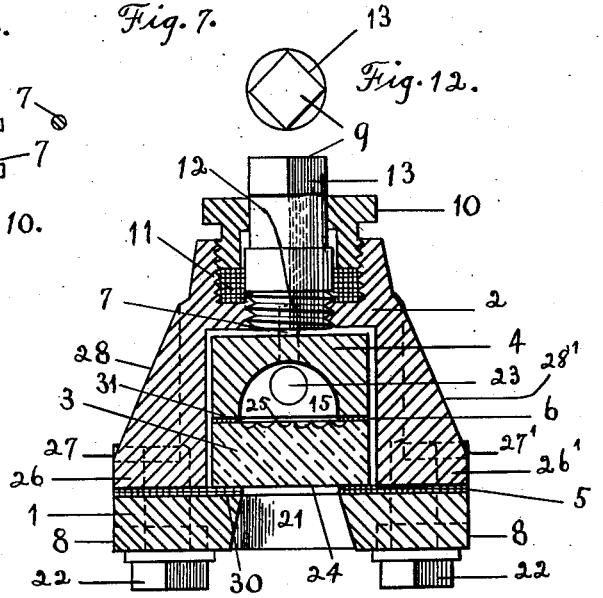
Fig. 12.
Fig. 11.
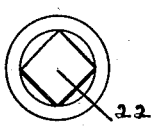
Fig. 13.
WITNESSES:
Fred J. Thomas.
Elizabeth Van Brunt.
INVENTOR
Abram Van Brunt.

UNITED STATES PATENT OFFICE.

ABRAM VAN BRUNT, OF BRIDGEPORT, CONNECTICUT.

WATER-COLUMN.

1,097,274.   Specification of Letters Patent.   Patented May 19, 1914.

Application filed July 2, 1912. Serial No. 707,401.

*To all whom it may concern:*

Be it known that I, ABRAM VAN BRUNT, a citizen of the United States, and a resident of Bridgeport, county of Fairfield, and State of Connecticut, have invented certain new and useful Improvements in Water-Columns, of which the following is a specification.

My invention relates to an improved form of water-column, in which the front member is removable to permit the insertion and replacement of the glass together with its packing member, and a frame member, all of which members are removable through the front opening of the casing, that is closed by the front member of the water-column.

A further object of my invention is to provide an improved form of packing or gasket between the front of the glass, and the front member of the water-column, this packing or gasket being of only one piece.

Another object of my invention is to provide an improved form of packing member or gasket, between the rear of the glass, and the removable frame member, that will permit free circulation of the water through the device, at the rear of the glass, and that will also freely admit of expansion and contraction of the glass.

With these objects in view, the invention will be hereinafter more particularly described with reference to the accompanying drawings, which form a part of this specification.

Figure 1:
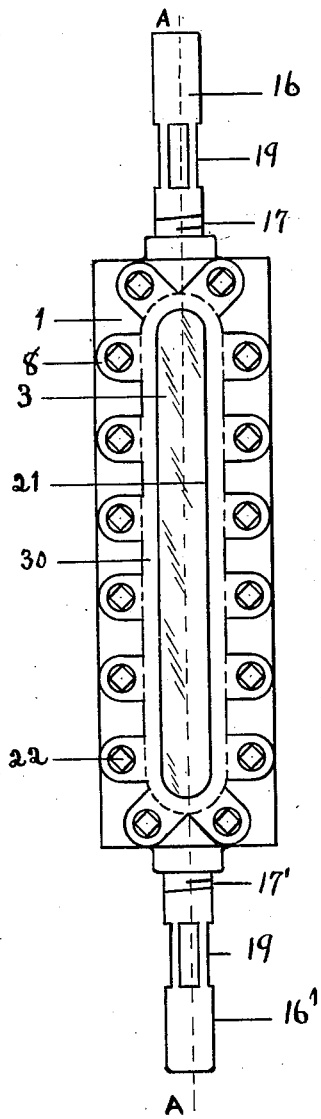
Figure 2:
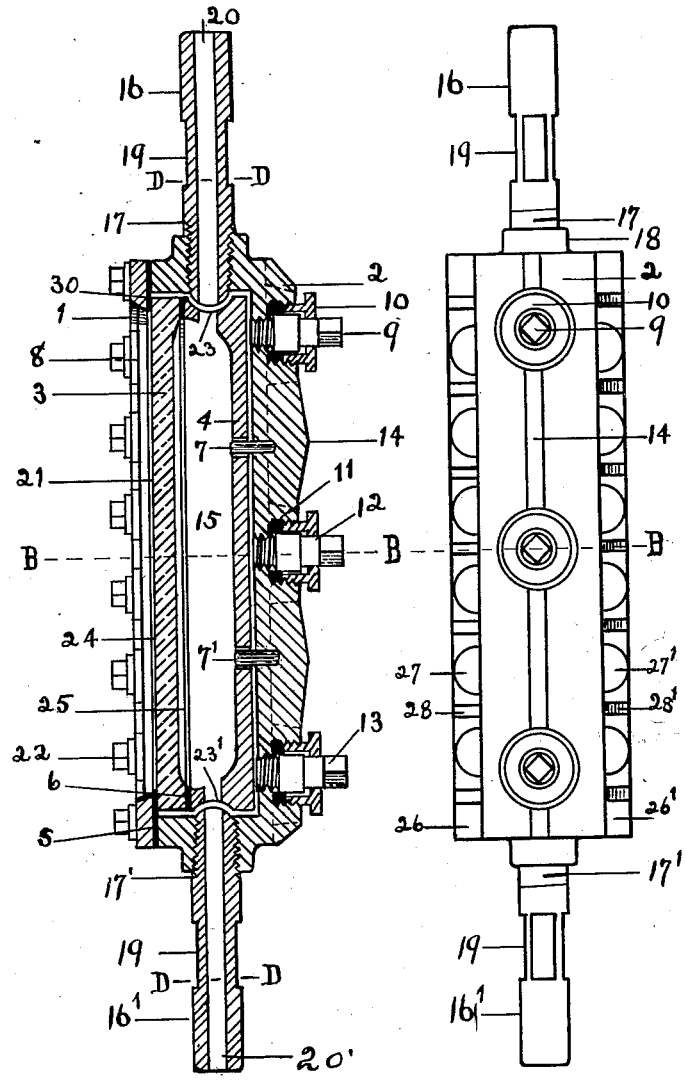
Figure 4:
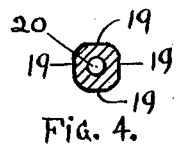
Figure 3:
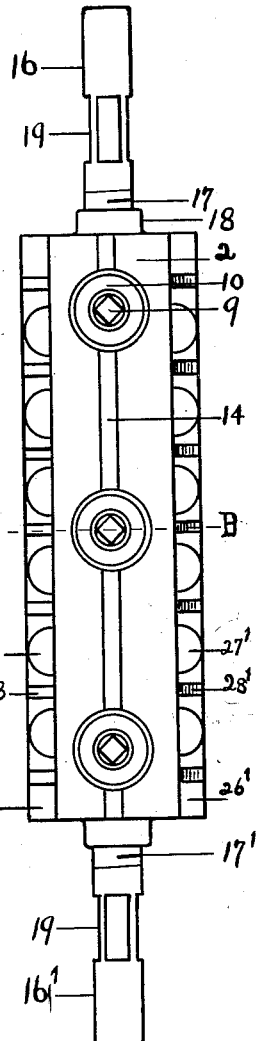

In the accompanying drawings illustrating my invention, Figure 1, is a front view of the water column; Fig. 2, is a vertical section on the line A—A of Fig. 1; Fig. 3, is a rear elevation of the device; Fig. 4, is a section view of the pipes on the line D—D of Fig. 2; Figs. 5, 6, 7, 8, 9 are views and sections of the removable frame member forming a part of the water column; Fig. 10, is a view of the dowel pin, used in connection with the removable frame member; Fig. 11, is a transverse section on the line B—B, Figs. 2, 3; Fig. 12, is a plan view of an adjusting screw; and Fig. 13, a plan view of one of the bolts used to fasten the front member to the back member or casing of the device.

2 represents an elongated body of the casing of the water column which is formed of one integral casting having a longitudinal pocket therein, and is further provided with holes in its upper and lower ends to receive the pipe connections 16 and 16' respectively. Suitable ribs 28 and 28' are formed on the sides of the body to strengthen the same. The front plate 1 is provided with a central longitudinal sight opening 21 and further includes a marginal portion 30, against which the glass 3 is placed with its interposed gasket 5, the latter of which is of one piece, and extends across the flat back surface of the front member 1. The front member 1, is provided with bosses 8, through which the bolts 22, pass and help to strengthen the said member, when the member is bolted and fastened to the flange 26 of the casing 2. These bolts are provided all around the front opening of the casing, to make a water tight joint at the front marginal edges of the casing.

The frame member 4, Figs. 5, 6, 7, 8, 9, which is to be inserted from the front of the body, is formed a little smaller than the opening in the body, and is provided with an elongated cavity 15 into which the steam and water have free access. This frame is placed on the dowel pins 7—7', which are arranged in holes formed inside of the casing to keep the body member in its proper position.

A gasket 6, is placed between the frame 4, and the glass 3, and is formed of suitable shape and size, to correspond with the face 31, of the frame member 4, as shown in Fig. 5.

The cavity 15, is to provide a space for the water, and 23—23', are passages for the circulation of the water, at the back of the glass, 3. The water passes through the openings 20—20', in the pipes 16—16', to which are attached the connections of another vessel; the pipes are threaded at their ends 17—17' in the usual manner, and have the flat portions 19 for the use of a wrench.

The glass 3, is clamped between the gasket 5, pressing against the marginal flange 30 of the opening 21, in front member 1. A packing member 6, is pressed against the back 25, of the glass 3, by the frame member 4, the latter being secured in position by the adjusting screws 9, passing through and having threads 12 to engage the back of the casing 2, and being further provided with packing nuts 10, and packing 11.

The front opening of the casing being closed by the front member 1, and the glass 3, the bolts 22, may be taken out, and the glass 3, and the frame member 4, with the gasket 6, can be removed by drawing them forward through the opening in the casing, thus permitting the parts to be removed and replaced. It will further be seen that it will not be necessary to remove the frame member 4, when it is desired to remove or replace the glass 3, in this water-column.

I am aware that prior to my invention, water-columns have been made with a front member in conjunction with a glass. I therefore do not claim such a combination broadly; but

I claim—

1. In a water column of the class described, the combination of an elongated integral body having a pocket therein and holes in its ends, a removable front closure plate secured thereto and having a central longitudinal sight opening therethrough and having an inner flat surface, a flat gasket covering the flat surface of the closure plate and arranged in part against the body, a transparent closure fitted over the sight opening and against the inner edge portion of said gasket, an integral elongated frame member arranged within the casing and having a cavity therein and a steam inlet and outlet in line with the holes in the body, and a series of adjusting screws fitted through the integral or solid back portion of the body to engage the frame to set the same against the transparent member.

2. In a water column of the class described, the combination of an elongated integral body having a pocket therein and holes in its ends, a removable front closure plate secured thereto and having a central longitudinal sight opening therethrough and having an inner flat surface, a transparent closure fitted over the sight opening, an integral elongated frame member arranged within the casing and having a cavity therein and a steam inlet and outlet in line with the holes in the body, a series of pins fitted in both the body and the frame to support the latter, and a series of adjusting screws to engage the frame to set the same against the transparent member.

3. In a water column of the class described, the combination of an integral body having an elongated pocket therein and holes in its ends, a removable front closure plate secured thereto and having a central longitudinal sight opening therein and having an inner flat surface, a transparent closure fitted against said flat surface of the closure plate and a gasket intermediate of said closure plate and the body and between the front surface of said closure plate and the transparent closure, the edge portion of said transparent plate being free from engagement with any of said parts to permit of contraction and expansion, an integral elongated frame member arranged within the casing and having an elongated cavity therein open against the transparent closure and having a steam inlet and outlet in line with the holes in the body, a gasket arranged between the said frame and the transparent member, and a series of adjusting screws mounted in the body and engaging the frame to set the same against the transparent member.

This specification signed and witnessed this first day of July A. D. 1912.

ABRAM VAN BRUNT.

Witnesses:
 FRED. J. THOMAS,
 ELIZABETH VAN BRUNT.

Copies of this patent may be obtained for five cents each, by addressing the "Commissioner of Patents, Washington, D. C."